United States Patent [19]
Susa et al.

[11] Patent Number: 5,205,484
[45] Date of Patent: Apr. 27, 1993

[54] COOLING SYSTEM FOR A WATER COOLED INTERNAL COMBUSTION ENGINE FOR VEHICLE HAVING AN AIR CONDITIONING APPARATUS

[75] Inventors: Sumio Susa, Anjo; Kazutaka Suzuki, Kariya; Toshio Morikawa, Aichi; Tatsuo Sugimoto, Kariya; Atsushi Katoh, Nagoya, all of Japan

[73] Assignee: Nippondenso Co., Ltd., Kariya, Japan

[21] Appl. No.: 795,896

[22] Filed: Nov. 22, 1991

[30] Foreign Application Priority Data

Nov. 23, 1990 [JP] Japan ................................ 2-320010
Jan. 23, 1991 [JP] Japan ................................ 3-24203
Aug. 16, 1991 [JP] Japan ................................ 3-231189

[51] Int. Cl.$^5$ ............................................. F01P 7/02
[52] U.S. Cl. .................... 236/35.3; 123/41.04; 165/35
[58] Field of Search ............ 236/35, 35.2, 35.3; 165/39, 35; 123/41.05, 41.06, 41.04; 62/183

[56] References Cited

U.S. PATENT DOCUMENTS 2,336,840 12/1943 Brehob .
4,429,666 2/1984 Surace et al. ................ 123/41.06 X

FOREIGN PATENT DOCUMENTS 2235183 2/1974 Fed. Rep. of Germany .
3836374 1/1990 Fed. Rep. of Germany .
848686 11/1939 France .
0165519 9/1983 Japan ................................ 123/41.06
3-17133 2/1991 Japan .

Primary Examiner—William E. Wayner
Attorney, Agent, or Firm—Cushman, Darby & Cushman

[57] ABSTRACT

A vehicle provided with an internal combustion engine and an air conditioning system for a vehicle passenger cabin. A condenser of the air conditioning system is arranged in front of a radiator of the engine in an engine compartment of the engine. A duct is arranged between the condenser and the radiator for preventing the air passing the radiator from being returned forward P. A first damper, which is normally closed is provided in the duct, but is opened when the engine temperature is high to provide a flow of air, by-passing the condenser, directly into the radiator.

12 Claims, 18 Drawing Sheets

COOLING SYSTEM FOR A WATER COOLED INTERNAL COMBUSTION ENGINE FOR VEHICLE HAVING AN AIR CONDITIONING APPARATUS

BACKGROUND OF THE INVENTION

1. Field of the Invention

The present invention relates to an air conditioning apparatus for a vehicle, capable of obtaining a desired control of an engine cooling system while obtaining a desired control of the air conditioning apparatus.

2. Description of Related Art

In a vehicle provided with an internal combustion engine, a radiator located in an engine cooling water recirculating system is arranged at the front of the engine body, and a cooling fan is arranged on the rear side of the radiator. A flow of air induced not only by the movement of the vehicle but also by the rotation of the cooling fan passing through the radiator, which can improve a heat exchange occurring at the radiator. Furthermore, when the vehicle is provided with an air conditioning apparatus, a condenser for condensing the cooling medium is arranged in front of the radiator in the direction of the flow of the air. Therefore, the flow of the air first passes through the condenser, and is, then, directed to the radiator located downstream from the radiator. When the air conditioning apparatus is operating, a gas state cooling medium of high temperature, owing to the compression thereof by a compressor, is introduced into the condenser, and is subjected to a heat exchange operation with respect to the air flow, which causes the cooling medium to be condensed to a liquid. Therefore, heating of the air flow induced by the movement of the vehicle and by the rotation of the cooling fan is generated when the air flow is in contact with the condenser through which a cooling medium of high temperature is passed, and the heated air flow is directed to the radiator located downstream from the radiator in the direction of the flow of the air. At the radiator, a cooling of the recirculated engine cooling water takes place to obtain a desired temperature of the cooling medium.

It has recently been required that the air conditioning apparatus for a vehicle be much more comfortable, which necessarily increases the required cooling ability of the air conditioning apparatus for a vehicle. Furthermore, a recent preference for high power engines has resulted in an increase in the amount of heat generated from an engine. Recent requirements of luxury cars has also resulted in the increase in the number of parts in the engine compartment resulting in the existence of very little excess space in the same. Furthermore, a declivity in of the hood is recently preferred in car design, which decreases the air generating efficiency induced by the movement of the car, resulting in a reduction in the available amount of cooling air.

When a loaded vehicle is climbing a slope in high temperatures summer it cannot be expected to obtain a high speed air flow induced by the movement of the engine, and the engine generates and emits a very large amount of heat, and the cooling demand, as required from the air conditioning apparatus, is high. In this situation, a large increase in the temperature of the air directed to the radiator portion occurs, thereby reduces the cooling ability of the cooling water in the radiator, and resulting in an increase in the temperature of the engine cooling water in the radiator.

In order to overcome the above mentioned difficulty, a solution has been proposed that stops the operation of the air conditioning apparatus when the temperature of the cooling medium exceeds a temperature of, for example, 100 degrees centigrade, or that uses a larger sized radiator or cooling fan device.

However, forced cessation of the air conditioning apparatus inevitably makes the cabin of the vehicle less comfortable. Employing a larger sized radiator fan is difficult to realize because of the limited available space in the engine compartment of the vehicle. In addition, employment of a larger sized fan does not necessarily increase the amount of air flow expected from the increase in the driving power owing to the fact that the air flow resistance of a vehicle as a total is increased.

Furthermore, when the engine is idling and therefore cannot expect to obtain an air flow caused by the movement of the vehicle, the amount of cooling air introduced into the condenser is small, thereby causing a reduction in the heat radiation efficiency of the condenser, which causes an increase in the pressure of the coolant issued from the compressor. As a result, the power necessary for driving the compressor is increased, thereby reducing the fuel consumption efficiency during the operation of the vehicle in high temperatures.

SUMMARY OF THE INVENTION

The present invention aims to overcome the above mentioned difficulties encountered in the prior arts.

Therefore, an object of the present invention is to provide an air conditioning apparatus, for an automobile, capable of increasing its cooling ability.

Another object of the present invention is to provide an air conditioning apparatus for an automobile, capable of decreasing the driving power required for its compressor to increase the fuel consumption efficiency of an internal combustion engine.

Another object of the present invention is to provide an air conditioning apparatus for an automobile with a water cooled internal combustion engine, capable of preventing an increase in the temperature of the cooling medium for the air conditioner even when the engine overheats because of an increase in the temperature of the engine cooling water, and thereby maintain a comfortable environment in the cabin of the vehicle.

Still another object of the present invention is to provide an air conditioning apparatus for an automobile with a water cooled internal combustion engine, capable of obtaining an effective operation even during high temperatures in hot summer season.

In a vehicle with an internal combustion engine having an engine body and a radiator located at the front of the engine in the direction of the forward movement of the vehicle, and an air-conditioning system having a condenser arranged in front of the radiator the improvement according to the present invention comprises:

means for allowing a flow of air to be generated when the vehicle moves forward;

guide wall means for defining a first passageway for receiving said flow as generated and for obtaining a first flow of air from the condenser to the radiator, said guide wall means preventing the air, after passing through the radiator, from being returned back around the radiator into the flow from the condenser to the radiator;

means for defining at least one second passageway for receiving said flow as generated and for obtaining an air flow by-passing the condenser and directly introducing the by-passed air flow into the radiator, and;

means, responding to a thermal load condition of the engine, for selectively opening or closing said second passageway.

BRIEF DESCRIPTION OF ATTACHED DRAWINGS

DESCRIPTION OF PREFERRED EMBODIMENT

Figure 1:
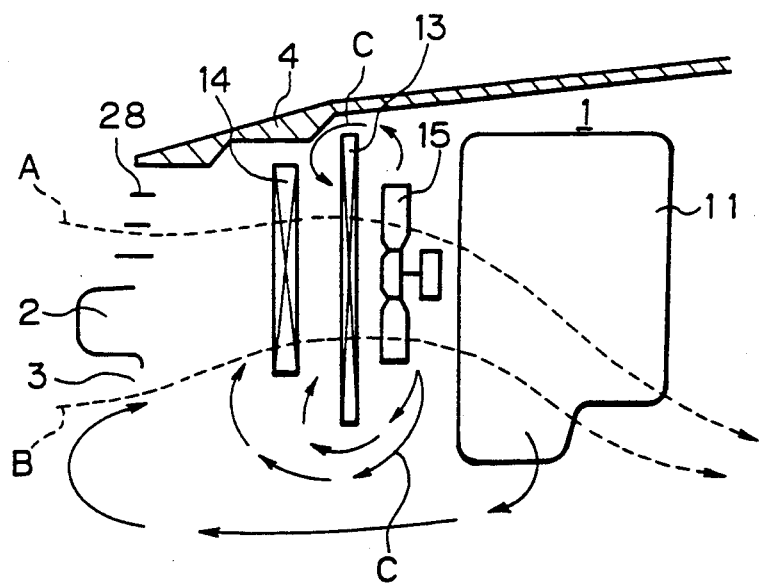
FIG. 1 is a schematic view of an arrangement in an engine compartment in a prior art.

FIG. 1 generally illustrates a problem to be solved by the present invention in the prior art. In FIG. 1, a reference numeral 11 denotes a body of an internal combustion engine arranged in the engine compartment 1 of an automobile. A reference numeral 4 is an engine hood, 28 a front grill, and 2 a bumper located below the front grill 28 at the front side of the vehicle body. A radiator 13 is arranged at the front of the engine body 11. A gap 3 is formed below the bumper 2 on the front side of the vehicle body. A condenser 14 for an air conditioning apparatus is arranged in front of the radiator 13. The condenser 14 is for condensing the cooling medium recirculated in the air conditioning apparatus. Due to the movement of the vehicle on one hand and the rotation of the fan 15 on the other hand, flows A and B are created and directed, via the condenser 14, to the radiator 13. The first flow A is introduced into the engine compartment 1 via the front grill portion 28, while the flow B is introduced into the engine compartment via the gap 3 below the bumper 2. According to the aerodynamic analysis by the inventors of the present invention, it is found that a part of the air after being subjected to the heat exchange at the radiator 13 returns around the condenser 14 and/or the radiator 13 as shown by arrows C, which are again introduced into the radiator 13 or the condenser 14. As a result of such a go back flow around the radiator 13 or the condenser 14, a substantial reduction in the ability to cool the engine cooling water occurs. In order to solve this problem an aerodynamic analysis of the air flow passing through the vehicle is carried out by the inventors of the present invention. First, the observation of an air flow in the engine compartment 1 of the vehicle by the inventors affirmed that, after the air flow is initially in contact with the radiator 13 for subjecting it to the heat exchange operation therewith, a partial return flow is created around the radiator or condenser. It is presumed that all of the air flow induced by the movement of the vehicle or the rotation of the cooling fan 15 passes through the radiator 13 to contact thereby, but, because of the existence of a reverse flow, the amount of air flow passing through the condenser 14 is substantially smaller than the amount of air passing through the radiator 13. In order to affirm this prediction, hot wire type air flow speed meters are arranged in front of the radiator 13 and condenser 14 to detect the actual air flow values. As a result of this measurement, the inventors of this invention found that, under idling conditions, there is a 35 percent decrease in the amount of air flow passing through the condenser 14, after passing through the radiator. The fact that there is a decrease in the amount of air flow passing through the condenser after passing through the radiator is justified if the vehicle is climbing a slope, however, it was also found that the greater the speed of the vehicle, the smaller the decrease in said amount of air flow. Such a decrease in the amount of air flow in contact with the condenser 14 can necessarily greatly increase the temperature of the air after contacting the condenser 14, which is, as previously mentioned, partly returned to the radiator due to the reverse flow generated in the engine compartment, which greatly increases the temperature of the air at the inlet of the radiator 13, thereby resulting in the reduced cooling efficiency of the coolant in the radiator.

Figure 2:
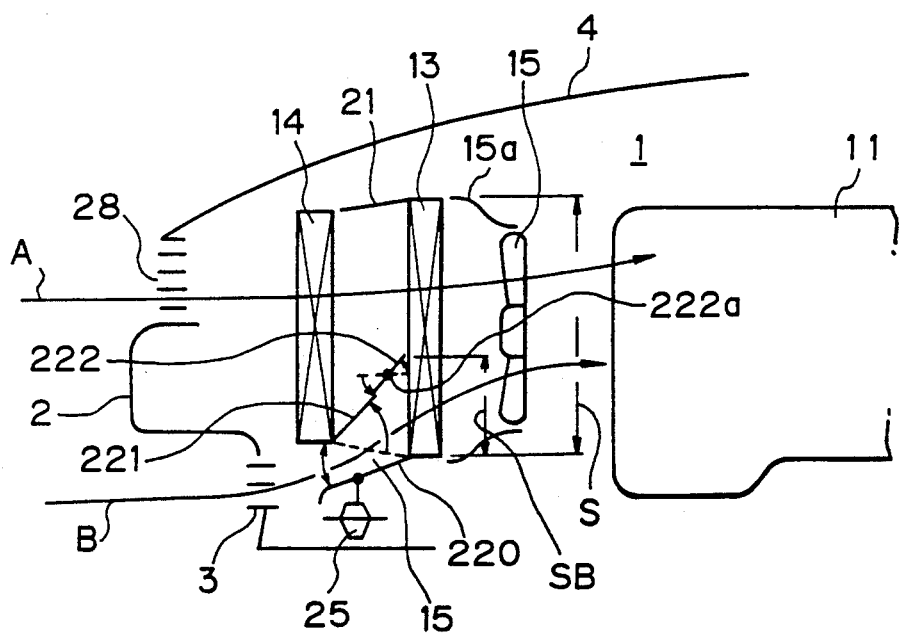
FIG. 2 is a schematic view of the arrangement in an engine compartment according an embodiment of the present invention.

FIG. 2 illustrates an embodiment of the present invention that can overcome the above mentioned difficulty in the prior art. An explanation of a construction similar to that of the prior art in FIG. 1 is omitted to eliminate unnecessary repetition of the explanation, while the same reference numbers are used for the parts as in FIG. 1. A tubular duct 21 of rectangular cross sectional shape is arranged between the condenser 14 and radiator 13 for obtaining a controlled flow of cooling air from the condenser 14 to the radiator 13. The duct 21 also serves to prevent hot air from the engine 11 from returning to the cooling air passageway between the condenser 14 and the radiator 13. The guide duct 21 is provided with a first damper 220 arranged at the bottom thereof for selectively creating a passageway 15 for by-passing the radiator 13, and the guide duct 21 is also provided with a second damper 221 and guide 222, for dividing the cooling air passageway between the condenser 14 and the radiator 13 into two sections, as will be described later. The first damper 220 is, at its bottom end, pivotally connected to the bottom end of the radiator 13, so that the other end (upstream end) of the first damper 220 is moved between an opened position shown by a solid line, where the damper 220 is spaced from the condenser 14 to form the by-pass passageway 15, and a closed position shown by a dotted line where the damper 220 is in contact with the condenser 14. An actuator 25 is provided for obtaining a pivotal movement of the first damper 220 for carrying out the selective by-pass operation.

The second damper 221 is, at its first end (upstream end), pivotally connected to the bottom end of the condenser 14, so that the other end (downstream end) of the damper 221 is moved between a non-partitioning position where the damper 221 is in face to face contact with the first damper 220, which is closed as shown by the dotted line, and a partitioning position as shown by the solid line where the by-pass passageway 15 of air into the radiator 13 from the outside of the duct 21 for direct introduction of the said air, is created.

The guide 222 has, at its center position 222a, a pivot axis, so that the guide 222 is moved between a partitioning or inclined position, as shown by the solid line where the guide 222 is situated as an extension of the second guide 221 for creating the direct flow of air into the radiator 13 via the by-pass passageway 15, and a non-partitioning or horizontal position, as shown by a dotted line where the guide 222 is located parallel to the flow of the cooling air from the condenser 14.

These dampers 220, 221 and 222 are controlled in accordance with the thermal load of the engine 11 detected, for example, by the temperature of the cooling water of the engine. Namely, when the first damper 220 is closed (dotted line), the second damper 221 is in face to face contact with the first damper 220 and the guide 222 is in a horizontal position (dotted line), so that all of the air from the condenser 14 is introduced into the radiator 13, as shown by an arrow A in FIG. 1, mainly from the front grill 28, i.e., no air flow bypassing operation is obtained. The air flow after contacting the radiator 13 is directed to the engine body via the fan 15 located inside a duct 15a, and leaves the vehicle. Contrary to this, when the first damper 220 is opened (solid line in FIG. 1), the second damper 221 and the guide are rotated to the respective partitioning positions (solid line), so that the flow, as shown by the arrow A from the radiator 14, and also the direct flow by-passing the condenser 14, as shown by an arrow B from the gap 3 below the bumper 2, are directed to the radiator 13.

Figure 3:
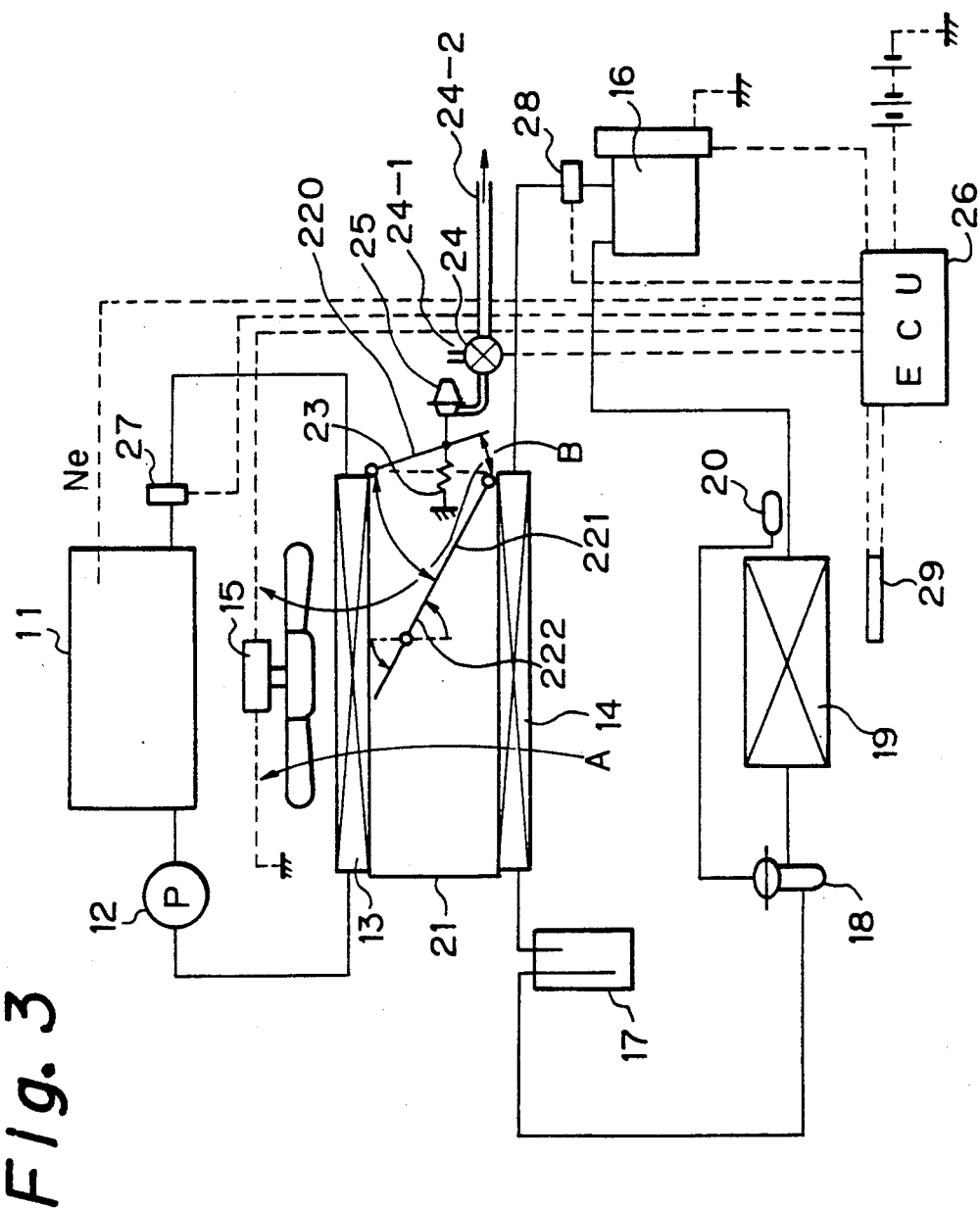
FIG. 3 is a schematic construction of an engine water cooling system of an internal combustion engine for a vehicle and air conditioning system.

FIG. 3 generally shows a recirculation system of the engine cooling water as well as an air conditioning apparatus for the vehicle. The recirculation system for the engine cooling water includes a water pump 12, which supplies the cooling water via the radiator 13 to a water jacket in the engine body 11, from which the cooling water is removed by a water pump 12 for recirculation. An engine cooling water temperature sensor 27 is arranged in the recirculating pipe line at a position upstream of the engine body 11 for cooling water temperature Tw detection.

The air conditioning system includes, in addition to the previously mentioned condenser 14, a compressor 16, a receiver 17, an expansion valve 18 and an evaporator 19. As is well known, the gaseous cooling medium of high temperature and high pressure from the compressor 16 is introduced into the condenser 14 to liquidize the coolant thereat. The thus obtained liquid coolant is introduced, via the receiver 17 and the expansion valve 18, to the evaporator 19 whereat a heat exchange operation takes place to cool the air flow in contact with the evaporator 19, the air flow of which is introduced into the passenger room for air conditioning thereof. The coolant after subjected to the heat exchange operation at the evaporator 19 is returned to the compressor 16 for repetition of the cooling cycle of the cooling medium for air conditioning. As is well known to those skilled in this art, a control apparatus for controlling the degree of opening of the expansion valve 18 is provided in accordance with the change in the pressure inside the temperature sensitive tube 20 at the outlet of the evaporator 19, the pressure of which corresponds to the temperature of the cooling medium at the outlet.

As shown in FIG. 3, a spring 23 is connected to the first damper 220 for urging it to normally take the closed position. The actuator 25 connected to the first damper 220 is constructed as a vacuum actuator having a diaphragm (not shown) therein to which a three way valve 24 is connected. The valve 24 is switched between a first position where the vacuum actuator 25 is connected to a pipe 24-1 opened to the atmospheric pressure and a second position where the actuator 25 is connected to a pipe 24-2 opened to a vacuum source such as an intake manifold (not shown) of the engine 11 or vacuum pump (not shown). When the three way valve 24 is located so that the vacuum actuator 25 is opened to the vacuum source, the actuator 25 generates a force against the spring 23 to open the first damper 220. The actuator 25 also serves to operate the second damper 221 and the guide 222, for which a link mechanism (not shown) is arranged between the actuator 25, the damper 221 and guide 222, thereby obtaining a cooperative movement of the second damper 221 and guide 222 with respect to the first damper 220, as already explained.

A control circuit 26 as a microcomputer unit is provided for controlling the electric operated fan 15, the electromagnetic three way valve 24, the compressor 16, a fan (not shown) for directing flow of air to the evaporator 19, and a damper (not shown) for controlling flow to the evaporator 19. The control circuit 26 is connected to various sensors for receiving various electric signals, such as an engine speed signal Ne, an engine cooling water temperature signal from the sensor 27, a signal from a sensor 29 indicating the temperature of the air to be cooled by the evaporator 19, and a signal form the sensor 28 for detecting the pressure of the cooling medium for the air conditioning apparatus.

Figure 4:
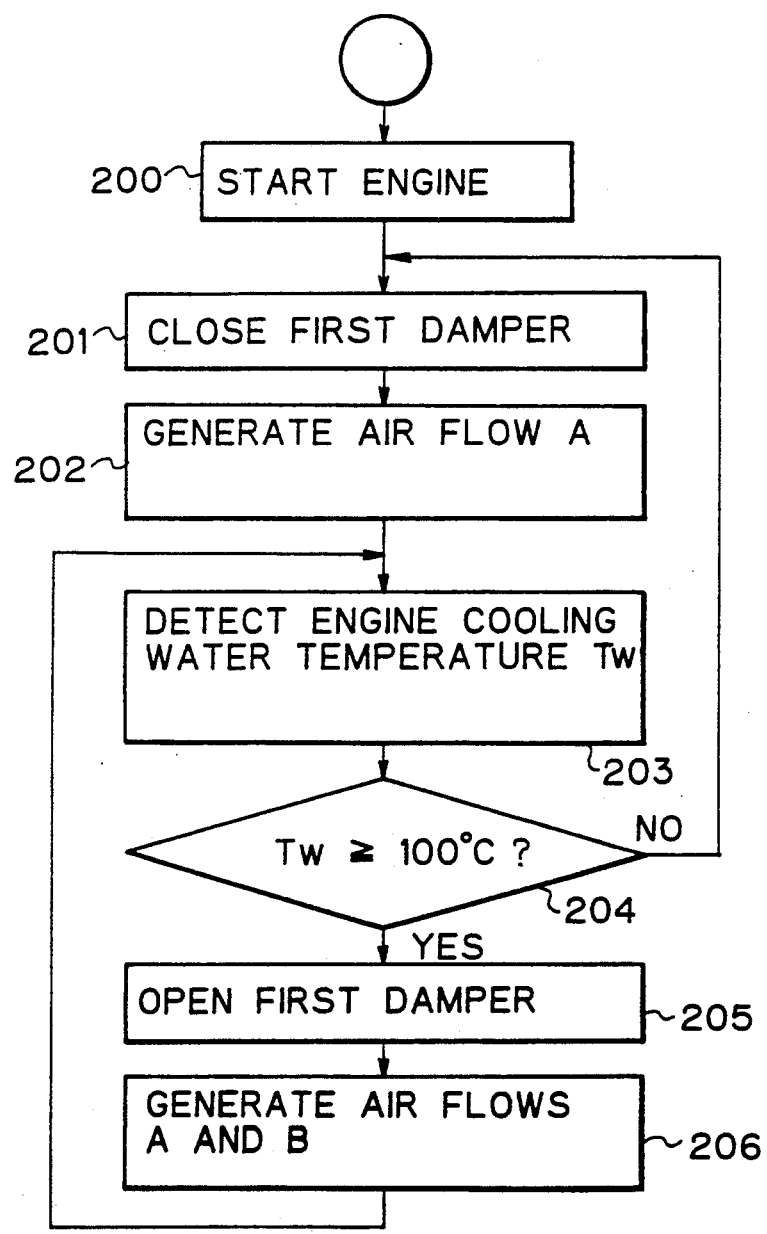
FIG. 4 is a flow chart illustrating an operation of the first embodiment.

Now, an operation of the air conditioning apparatus according to the present invention will be described with reference to a flow chart shown in FIG. 4. The routine in FIG. 4 is commenced when the engine is started (step 200). At step 201, the electromagnetic three way valve 24 is operated so that the actuator 25 encourages the first damper 220 to take a closed position as shown by the dotted line in FIG. 2, while the second damper 221 is brought in face to face contact with the first damper 220 located as shown by the dotted line, and the guide 220 is brought to a position, as shown by the dotted line, which is parallel to the flow of the air in the duct 21, so as not to provide any flow resistance to the flow from the condenser 14 to the radiator 13. As a result, all of the air flow directed to the radiator 13, as shown by an arrow A, and because of the movement of the vehicle and the rotation of the fan 15, is coming from the condenser 14 (see step 202). As will be understood from the above, according to this usual mode of operation including an engine idling operation, because of the closed position of the damper 220, which prevents air flow being directly introduced into the radiator 13 by by-passing the condenser 14, a substantial increase of the cool air flow amount passing through the condenser 14 (up to 30 percent) can be obtained in comparison with the prior art apparatus (FIG. 1) during the idling operation. The increase of the cooled air amount to the condenser 14 can increase the heat emission ability by the condenser 14 itself when the air conditioning apparatus is operated under engine idling conditions even during high temperature which enhances the air conditioning efficiency of the passenger cabin while decreasing the pressure of the cooling medium at the outlet of the compressor 16, thereby decreasing the consumption of engine power by the compressor 16. According to the result of the test done by the inventors, a 5 percent increase in the cooling ability is obtained over the prior art under engine idling conditions during high temperatures and a 9 percent decrease in the power required for driving the compressor is obtained.

Furthermore, the increased amount passing through the condenser 14 also reduces the increase in the air flow temperature after contacting the condenser 14, thereby a reducing the temperature of the air introduced into the radiator 13. As a result, the engine cooling water can maintain a lower temperature than that in the prior art.

During the execution of the routing in FIG. 4, the temperature $T_W$ of the engine cooling water is detected by the temperature sensor 27 (step 203), and determined if the detected value of the $T_W$ is equal to or larger than a predetermined value, such as 100 degrees centigrade (step 204). So long as it is detected that <100° (No result at step 204), the routine for the usual mode, as described above, is repeated to maintain the first damper 220 in a closed position while the second damper 221 and the guide 222 are rendered in-operative.

When a vehicle is operating under high load conditions, such as climbing a steep slope with low vehicle velocity, the engine cooling water temperature $T_W$ can reach 100° C. (result at step 204), so that the control circuit 26 issues a signal to the three way switching valve 24 to cause the diaphragm mechanism 25 to move the first damper 220 against the spring 23 to an open condition as shown as a solid line in FIG. 2, while the second damper 221 and guide 222 are moved to their respective partitioning positions (solid line). As a result, in addition to flow A of the air directed to the radiator 13 via the condenser 14, a flow, as shown by B by-passing the condenser and being directly introduced into the radiator 13, is obtained via the by-pass passageway 15. This means that, in this operation mode, the total air flow passing through the radiator is a sum of flow A from the condenser 14 and by-pass flow B of a temperature lower than that of the first flow A. As a result, an increase in the amount of cooling air is obtained by this mode in comparison with the usual mode obtained by a closed position (solid line) of the first damper 220 wherein only flow A is obtained. As a result, an increase in the cooling ability at the radiator 13 can be obtained.

There is, of course, a decrease in the amount of the cooling air passing through the condenser 14, as shown by an arrow A at this second mode when compared with that obtained at the first, usual mode, wherein the first damper 220 is closed, resulting in an increase in the temperature of the air conditioner cooling medium across the condenser 14. However, irrespective of this increase in the temperature across the condenser 14, a mean temperature of the air introduced into the radiator 13 is, as a total, reduced in comparison with when the first damper 220 is closed, because the air flow B introduced into the radiator 13 flowing along the direction of the movement of the vehicle has a lower temperature substantially corresponding to atmospheric temperature, which becomes the temperature at the inlet of the radiator 13. As a result, a large amount of heat emission is obtained at the radiator 13, permitting the reducting of the temperature of the engine cooling water. According to the result of the test by the inventors, an increase of about 10 percent in the cooling ability is obtained in a 2000 cc engine.

The area $S_B$ of the front side of the radiator 13, which flow B of the cooling air is in contact with (the area of the passage of the cooling air flow defined below the line of intersection of the plane defined by the second damper 221 and the guide 222 with the radiator 13) is preferably smaller than the 40% of the total front area S of the radiator. This preferable relationship between $S_B$ and S is determined by the mutual positional relationship between the condenser 14 and the radiator 13, as well as by the shape of the front end of the vehicle body. Namely, the greater the area of the passageway to the radiator 13 to which the air flow B is directed, the smaller the amount of air flow A contacting the condenser 14. When the vehicle is climbing a slope at a low speed, the engine speed is high, so that a large amount of air conditioning cooling medium is forced out of the compressor 16, therehby increasing the cooling ability of the air conditioning system. However, a reduction in the amount of air flow A contacting the condenser can increase the power consumption for driving the compressor 16. This means that the ratio of areas between $S_B$ and S should be determined so that the above mentioned advantage obtained by an increase in the area for air flow B is harmonized with the above mentioned disadvantage obtained by the reduction in the amount of air flow A. According to this embodiment, the ratio of value, in percent, of the inlet area $S_B$ of the radiator 13 for flow B to the total inlet area S of the radiator 13 is about 40 percent when the amount of air flow A passing through the condenser 14 is maintained at the value of air flow passing through the condenser 14 in the prior art device shown in FIG. 2. This clearly shows that the present invention makes it possible to obtain a reduced temperature of the engine cooling water without reducing the air conditioning ability of the air conditioning apparatus.

In a preferable embodiment, the engine cooling water from the engine 11 is introduced into the radiator from a bottom tank, then into a core portion with which air flow A or B is in contact, and finally into an upper tank from which the cooling water is returned to the engine. From the view point of increasing the efficiency of the emission of the heat from the radiator 13, it is desirable to introduce air flow B at the bottom of the radiator 13, i.e., the lower portion of the radiator core.

As mentioned above, in the above embodiment, during the usual mode of the operation, a main consideration is an increase in the efficiency of the air conditioning apparatus, and for realizing it, dampers 220 and 221 are closed to increase the amount of air introduced into the condenser 14, so that an increase in the air conditioning ability can be obtained, while an increase in fuel consumption efficiency can be obtained at the same time because of the effective use of the flow of the cooling air. Contrary to this, when operating under sever conditions, such as climbing a steep slope in high temperatures infrequently the dampers 220 and 221 are opened after a predetermined temperature (100 degrees centigrade) of the engine cooling water is obtained, for increasing the cooling ability of the radiator 13.

Figure 5:
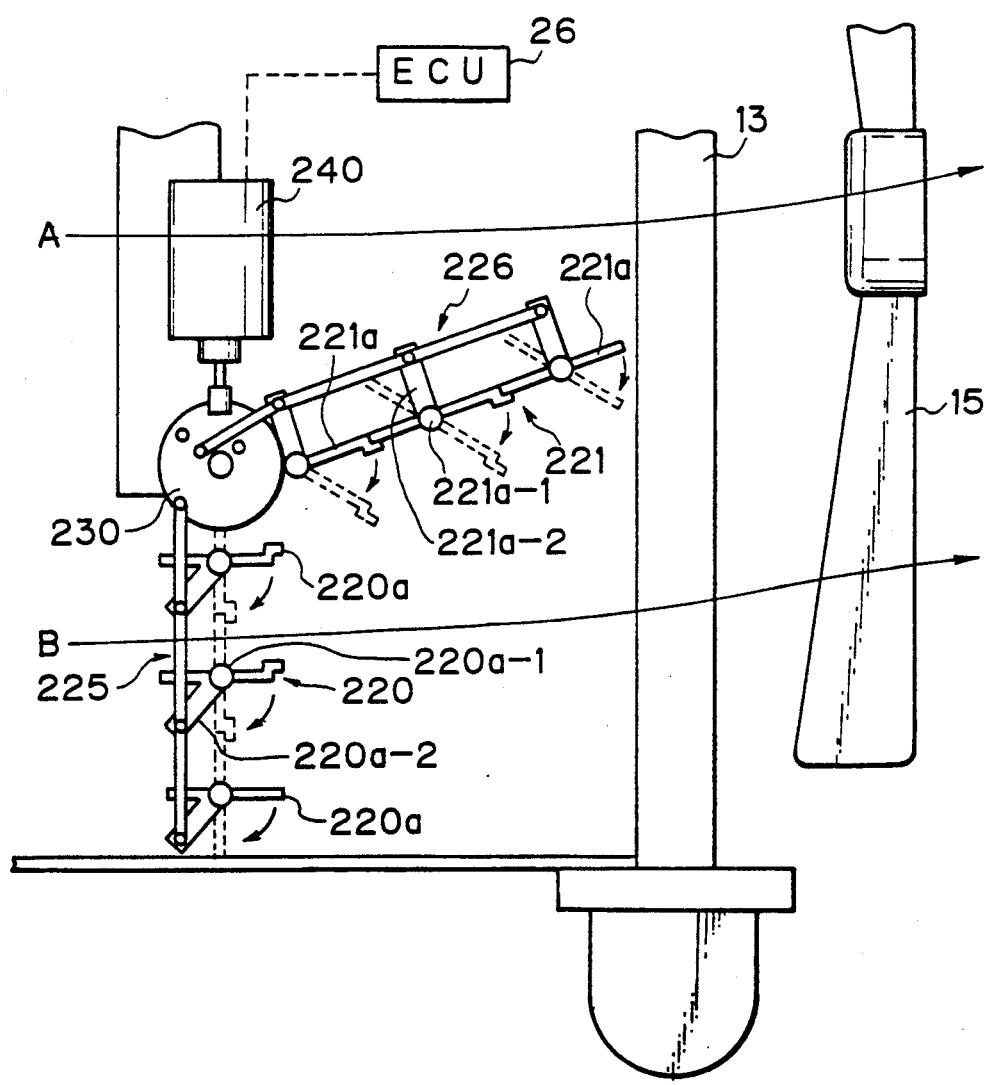
FIG. 5 is an enlarged view illustrating a detailed construction of first and second dampers in a second embodiment.

FIG. 5 is a second embodiment of the present invention, wherein a first and second damper 220 and 221 are constructed by a plurality of small dampers 220a and 221b, respectively. Each of the small dampers 220a has a pivot shaft 220a-1 for rotating it about its axis. The pivot shaft 220a-1 is connected to one end of a respective arm 220a-2, and the other end of the arm 220a-2 is connected, via a common rink 225 to a cam follower ring 230. The small dampers 221a have the same construction as that of the small dampers 220a, and therefore, each of the small dampers 221a has a pivot shaft 221a-1 for rotating it about its axis. The pivot shaft 221a-1 is connected to one end of a respective arm 221a-2, and the other end of the arm 221a-2 is connected, via a common link 226 to the cam follower ring 230. The cam wheel 230 is connected to a step motor 240 connected to an electronic control unit 26, so that the cam wheel 230 is rotated by the step motor 240 to obtain a simultaneous movement of the small dampers 220a and 221a. Under normal operating conditions, the first damper 220 is in a closed position, where as the small dampers 220a are aligned vertically as shown by dotted lines, and the second damper 221 is in a non-operating condition, where the small dampers 221a are in inclined in parallel positions as shown by dotted lines. As a result, similar to FIG. 1, only an air flow A from the condenser 14 (not shown in FIG. 5) is introduced into the radiator 13. In other words, under normal operating conditions, the first damper 220 is in a closed position, where the small dampers 220a are aligned vertically, as shown by dotted lines, and the second damper 221 is in a non-operating condition, whereas the small dampers 221a are in inclined and parallel positions, as shown by dotted lines. As a result, similar to FIG. 1, only an air flow A from the condenser 14 (not shown in FIG. 2) is introduced into the radiator 13. Contrary to this, under high load operating conditions, the first damper 220 is in an open position, whereas the small dampers 220a are aligned horizontally parallel as shown by solid lines, and the second damper 221 is in a closed position; the small dampers 221a are aligned as shown by solid lines, so that flow A from the condenser 14 and also direct flow B bypassing the condenser 14, is introduced into the radiator 13.

Figure 6:
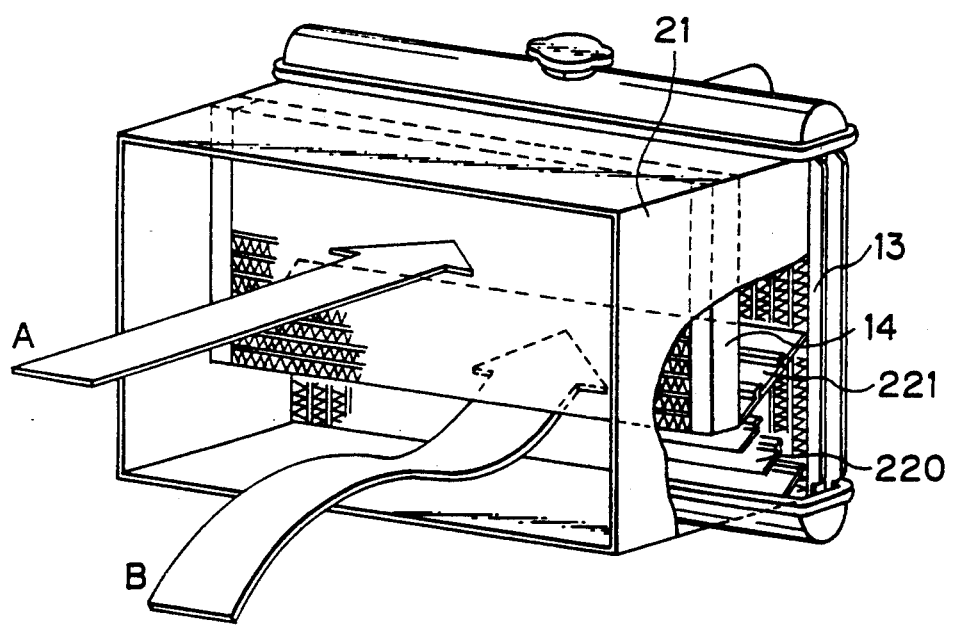
FIG. 6 is perspective view of another embodiment of the present invention.

FIG. 6 shows a perspective view of the radiator 13, condenser 14, the duct 21, and dampers 220 and 221 in perspective view, but slightly modified in that the flow induction duct 21 is forwardly extended from the condenser 14 toward the front grill 28 (see FIG. 2) so that an effective introduction of air flow generated by the vehicle when it is moving can be obtained.

Figure 7:
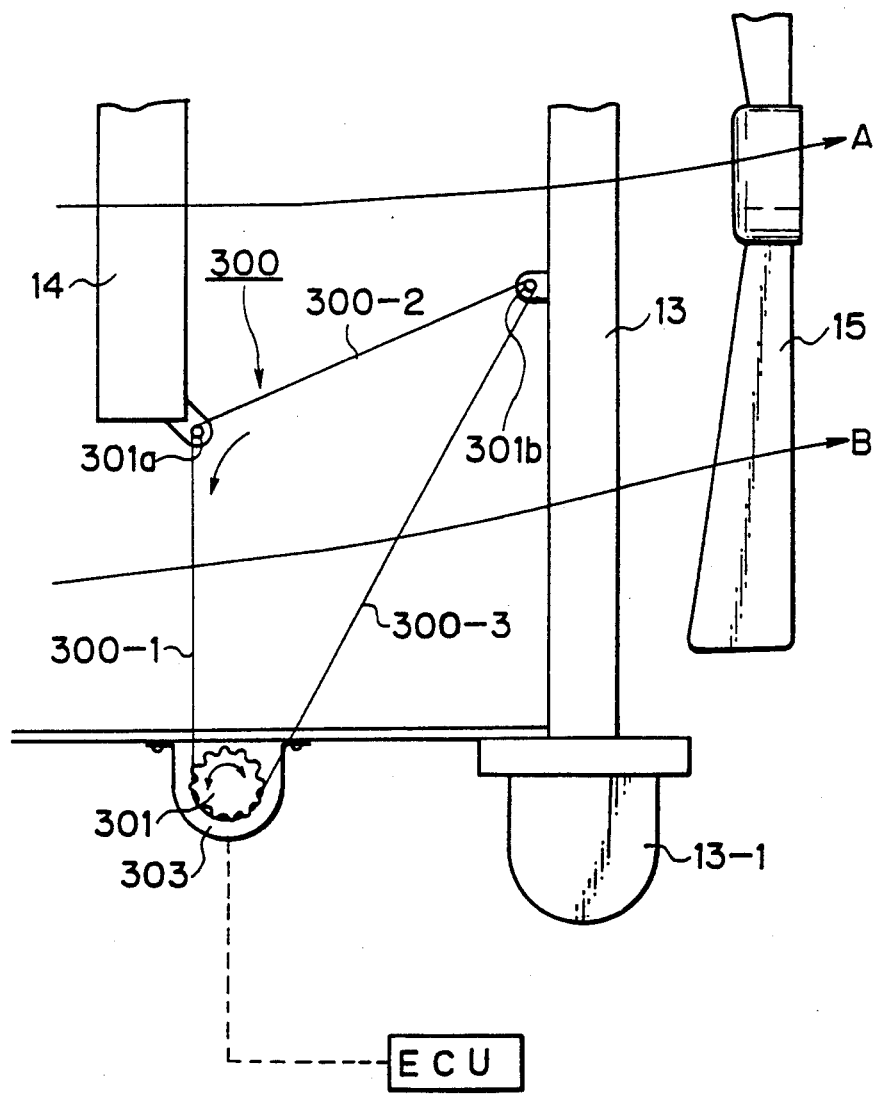
FIG. 7 is a schematic view of still another embodiment of the present invention.

In the embodiment shown in FIG. 7, a damper is constructed by an endless tape 300, which is looped around a pulley 301, 301a and 301b. The idler pulley 301a is mounted at the bottom of the condenser 14, while the idler pulley 301b is arranged at the portion of the radiator 13 spaced from the bottom tank 13-1 thereof. The pulley 301 is connected to a step motor 303 for rotating the pulley 301, which causes the tape 300 to move. The endless tape 300 has a portion 300-1 with no opening for preventing air flow from passing therethrough, and portions 30-2 and 300-3 with an opening for allowing the air flow to pass therethrough. At the usual mode of the air conditioner, the portion 300-1 is situated as shown in the drawing, which allows only the flow of air A from the condenser 14 to be introduced into the radiator 13. When the temperature of the engine cooling water exceeds the upper limit (100 degrees centigrade in FIG. 4), the tape 300 is rotated by the motor so that the closed part 301 comes to a position where the portion 300-2 is located in FIG. 7, and the opened portion 300-2 and 300-3 comes to a position where the portion 300-3 and 300-1 are now located in FIG. 7. As a result, flow A from the condenser 14 and also a direct flow B are obtained.

Figure 8:
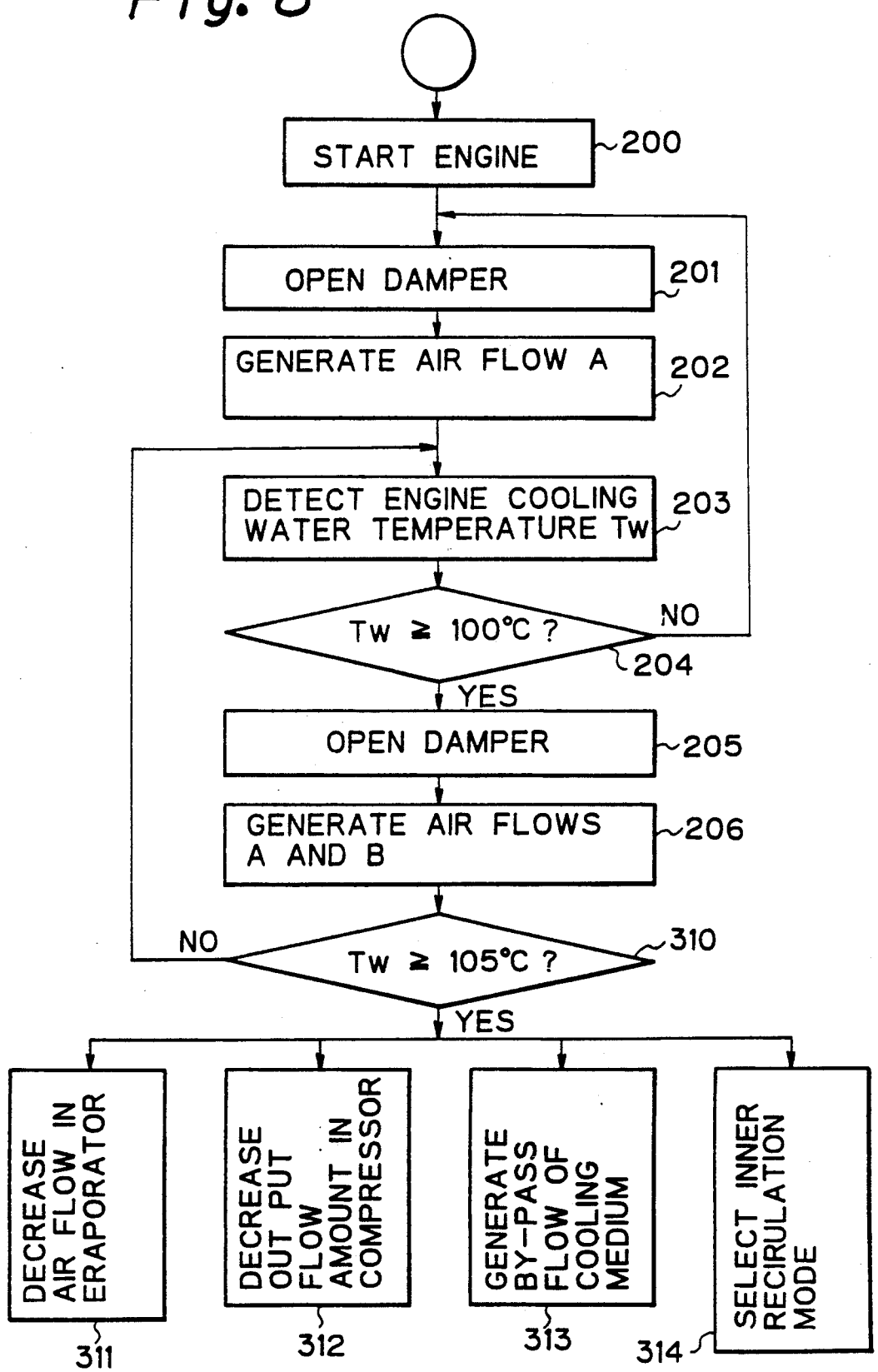
FIG. 8 is a flow chart illustrating another example of the operation of the present invention.

FIG. 8 shows a flow chart illustrating another example of an operation of the dampers, which is different from the flowchart in FIG. 4 in that the steps below 310 are added, and a more suitable control of the air conditioning ability is obtained after the dampers 220 and 221 are controlled. In this embodiment, after the damper 220 is opened (step 205) for obtaining flows A and B directed to the radiator 13, because the temperature of the engine cooling water Tw is higher than 100° C., the routine proceeds to step 310 where it is determined if the temperature of the engine cooling water is higher than 105° C. When Tw > 105° C., the routine proceeds to the steps below 311 for controlling the cooling ability of the air conditioning apparatus and is carried out to obtain a desired temperature of the engine cooling water. Namely, when the temperature of the engine cooling water is larger than the predetermined value, the air flow amount to the evaporator 19 is reduced by decreasing the voltage applied to the blower (step 311), an output rate of the air conditioning medium from the compressor 16 is reduced by controlling its output rate (step 312), a by-pass control valve in the compressor 16 is opened (step 313) for by-passing the air conditioning medium (step 313), and changing the air conditioning apparatus to an inner air recirculating from an outside air introduction mode. These control steps 311 to 314 are carried out separately or simultaneously, so that a load applied to the air conditioning apparatus is reduced, which prevents the engine cooling water temperature from increasing.

Figure 9:
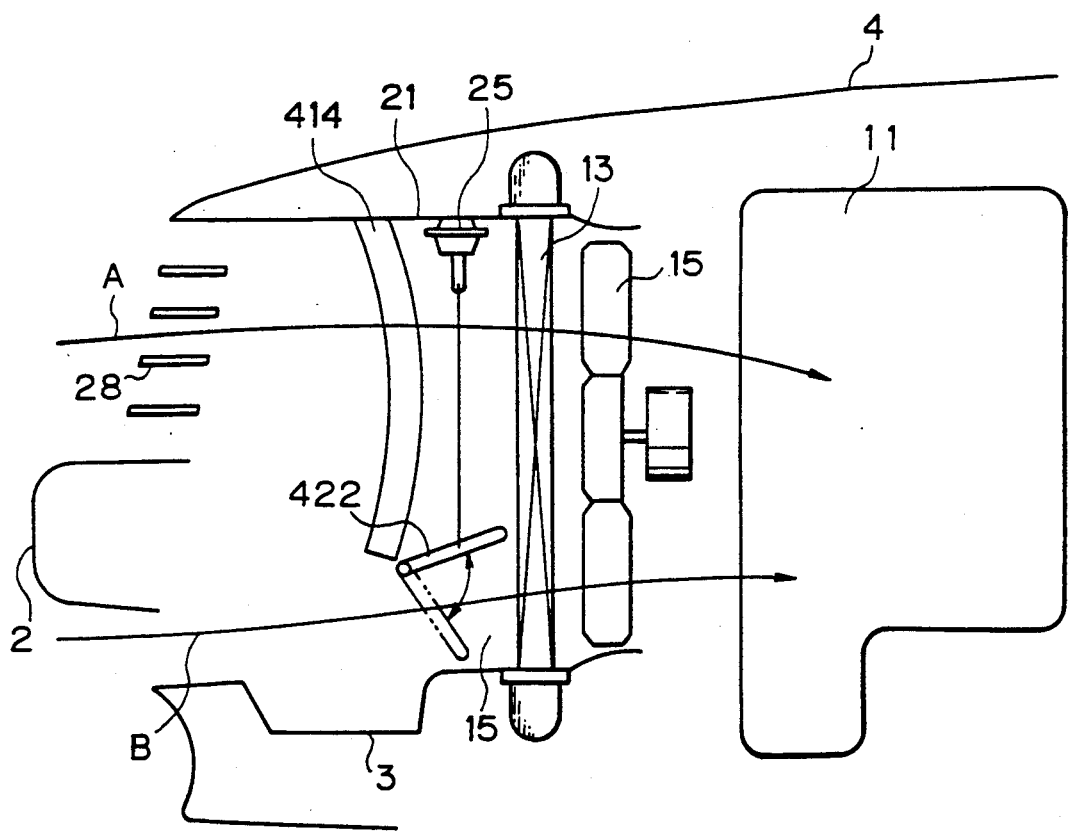
FIG. 9 is a schematic view of the arrangement in an engine compartment according to one embodiment of the present invention, wherein a concaved shape of the condenser is employed.

FIG. 9 shows another embodiment wherein it features a concave condenser 414 arranged upstream from the radiator 13 with a cross-sectional shape in the vertical plane parallel to the axis of the vehicle body, which is concaved toward the forward direction of the vehicle. The concaved shape of the condenser 414 increases the amount of air flow introduced into the condenser 414, compared with the flat type of condenser used in the previous embodiments, and is advantageous in that it can increase the emission of heat from the condenser 414 without increasing its dimension. In this embodiment, only one damper 422 is provided, which moves between a closed position, as shown by the phantom line, wherein all of flow A is introduced into the condenser 414 and radiator 13, and an opened position shown as a solid line, wherein, in addition to flow A, a flow B is generated that by-passes the condenser 414 and is directly introduced into the radiator 13. It should be noted that the condenser 414 of reduced height is located upward and is offset so that the upper end of the condenser 414 is flush with that of the radiator 13 so that the passageway 15 for air flow B is obtained when the damper 422 is opened.

Figure 10:
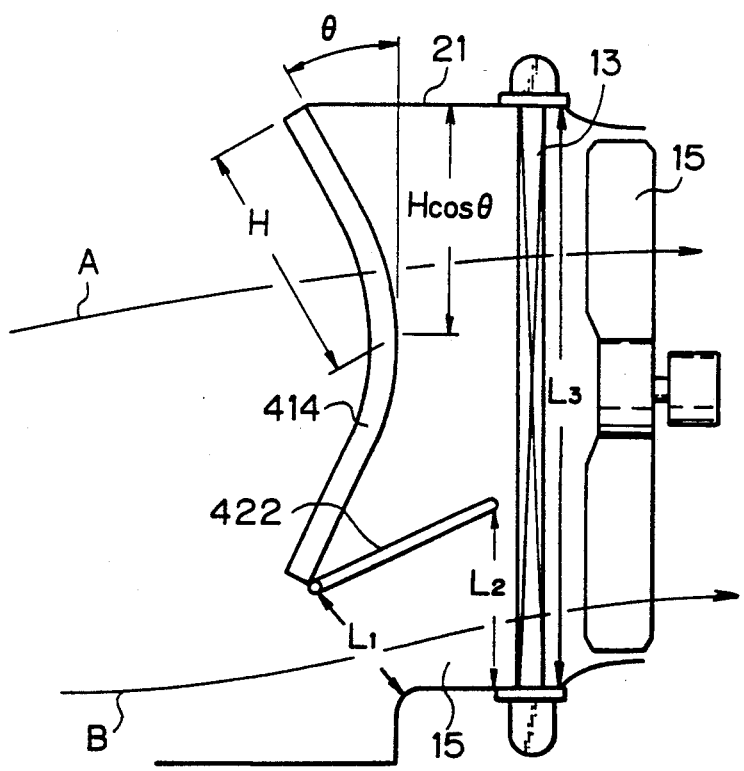
FIG. 10 is an enlarged view illustrating detailed dimensions of the condenser in FIG. 9.

FIG. 10 illustrates the geometry of a condenser 414 with a forwardly concave shape. First, the length $L_1$ of the opening, which is obtained when the damper 422 is in the opened position, is determined in accordance with the length $L_2$ of the radiator 13 opened by the damper 422 with respect to the total length $L_3$ of the radiator 13, the ability of the electric driven fan 15, a flow resistance of the condenser 414, a flow resistance of the radiator 13, and shapes or construction or dimension of the front portion of the vehicle, such as grill 28 and bumper 2 (FIG. 2).

When the length of the condenser, to its center from one end, is H, it is possible to reduce the height of the condenser for the length of $2H(1-\cos\theta)$ in comparison with the previous embodiments containing a flat type condenser 14, where $\theta$ is an angle of the plane of the condenser with respect to a horizontal line. This means that a large area of the opening for the by-pass air flow B can be obtained when the damper 422 is opened without reducing the amount of air flow A passing through the condenser 414, which makes it possible to reduce the temperature of the engine cooling water, while maintaining heat emission ability at the condenser 414. The value of $\theta$ is preferably about 25 degrees.

It should be noted that the amount of the cooling air flow B is also determined by the dimension of the opening $L_1$, the length $L_2$ of the radiator 13 opened by the damper 422 with respect to the total length $L_3$ of the radiator 13, the ability of the electric driven fan 15, the flow resistance of the condenser 414, the flow resistance of the radiator 13, and the pressure loss generated when the air flow B passes through the opening.

Figure 11:
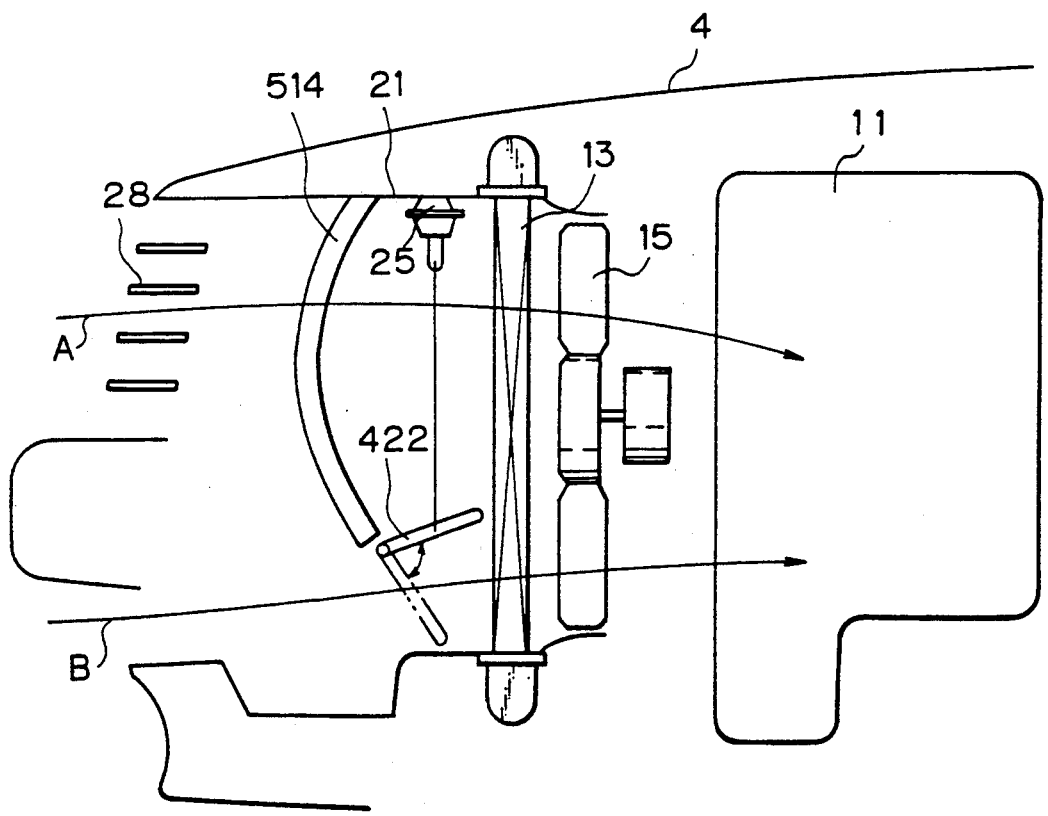
FIG. 11 is similar to FIG. 9, but the condenser has a convexed shape.

FIG. 11 shows an embodiment wherein a condenser 514 is forwardly convexed, which, similar to the embodiment in FIG. 9 (concaved condenser 414), allows the same amount of air flow A passing the condenser 514 while reducing the height thereof, thereby increasing the dimension of the opening for the air flow B by-passing the condenser 514 when the damper 422 is opened.

Figure 12:
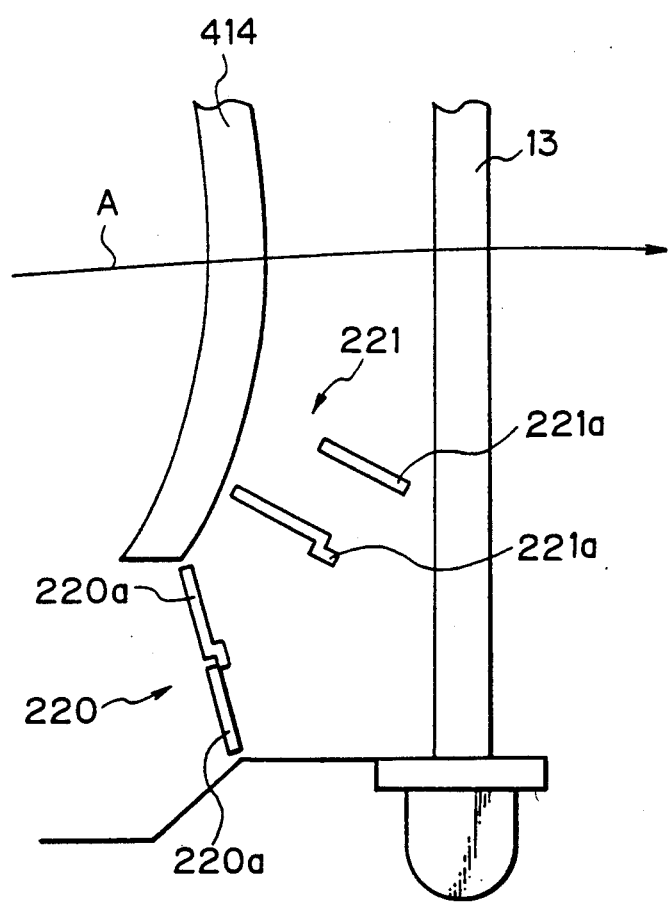
FIG. 12 is a modification of the embodiment in FIG. 10 where each is made of small dampers.
Figure 13:
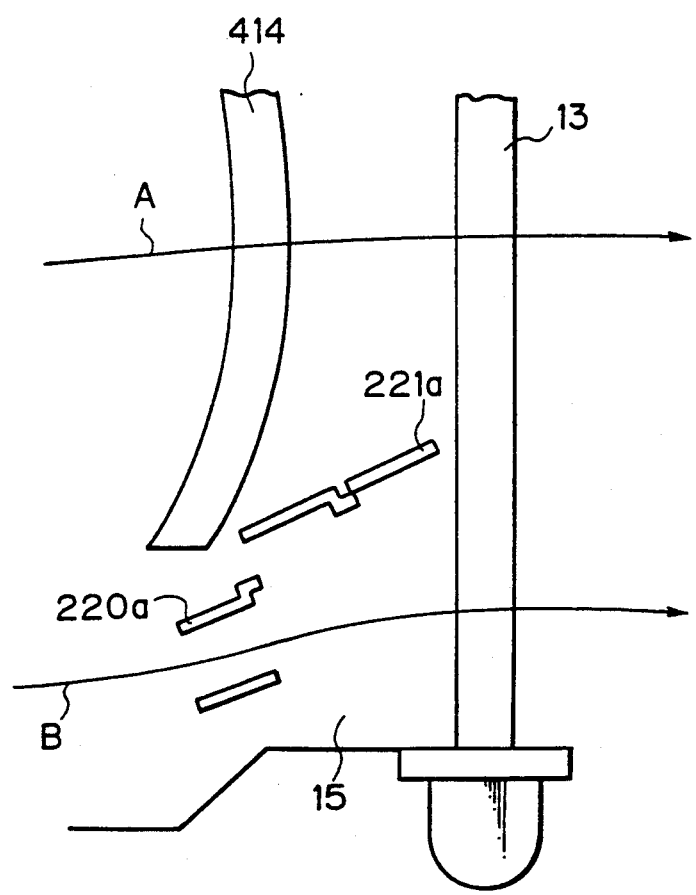
FIG. 13 shows the dampers in FIG. 12 when open.

In an embodiment shown in FIGS. 12 and 13, a first damper 220 and second damper 221 are, similar to the embodiment in FIG. 5, constructed from a plurality of rotatable small dampers 220a and 221a, respectively. During normal use, the damper 220a is closed while dampers 221b take respective open positions, as shown in FIG. 12, so that all of the air to the radiator comes from the curved condenser 414. When the temperature of the engine cooling water is higher than a predetermined limit (100° C. at step 204 in FIG. 4), the damper 220a is opened while dampers 221b take respective closed positions, as shown in FIG. 13, so that, in addition to the air flow A, an air flow B directed to the radiator 13 is obtained so as to by-pass the concave condenser 414.

Figure 14:
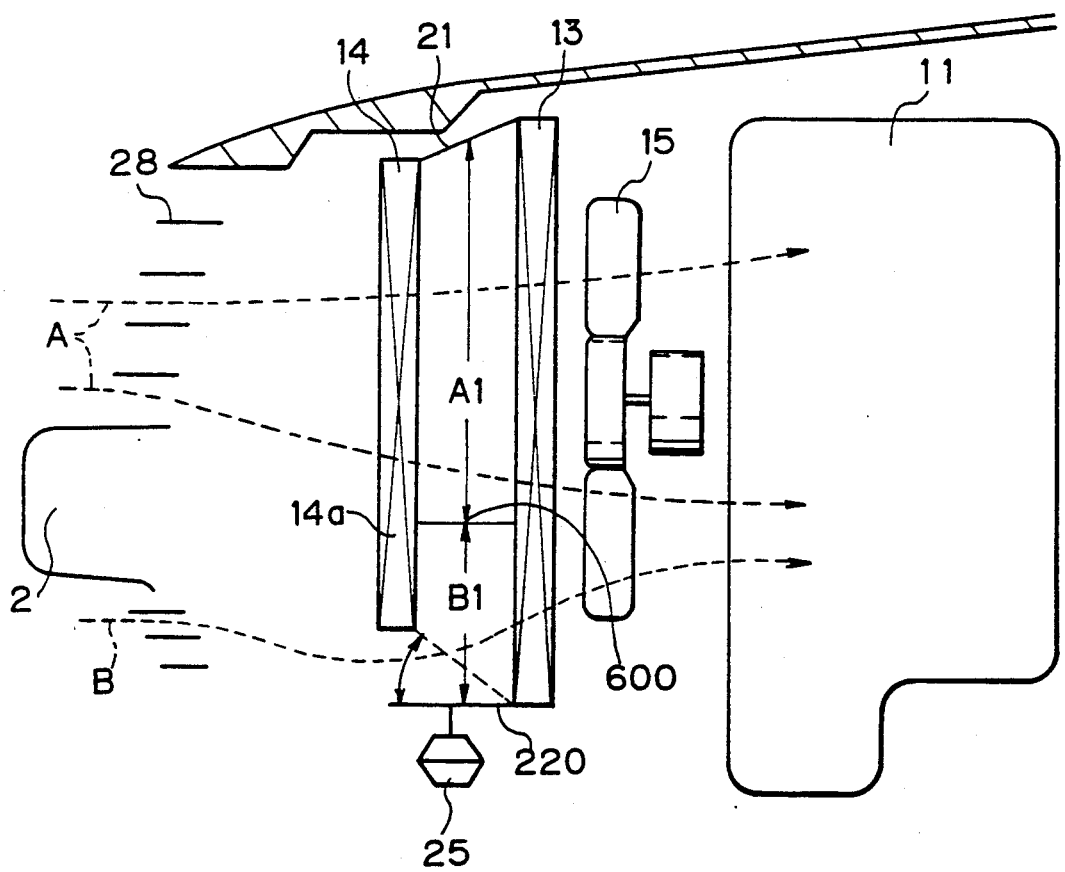
FIG. 14 is a schematic view of the arrangement in an engine compartment according to an embodiment of the present invention, where, in place of the second damper, a fixed plate is employed.
Figure 15:
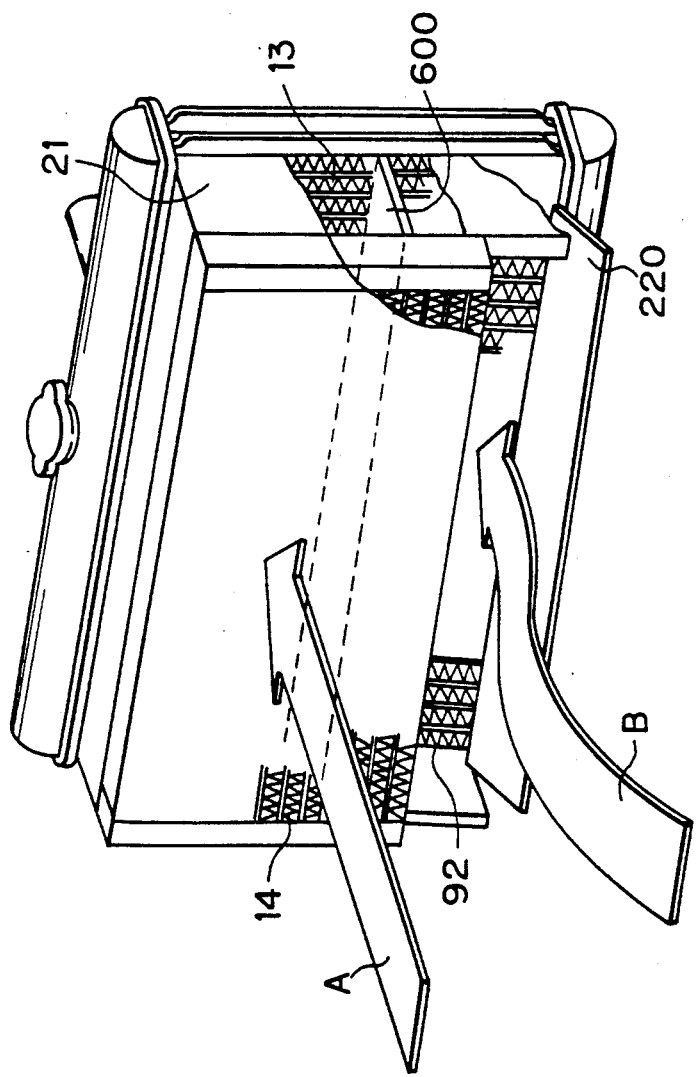
FIG. 15 shows a perspective view of the embodiment in FIG. 14.
Figure 16:
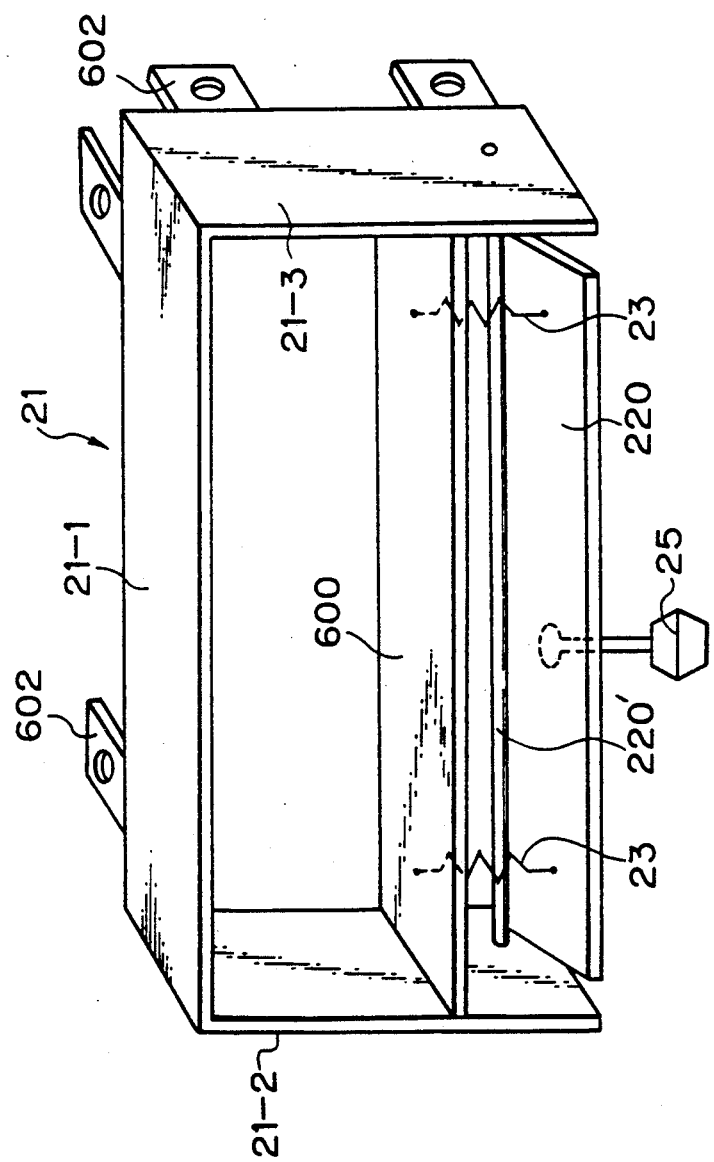
FIG. 16 shows a perspective view of a duct alone in FIG. 14.

An embodiment as shown in FIG. 14 features that, in place of the second damper 221 and guide 222 in FIG. 2 in the first embodiment, a fixed plate 600 is provided in the duct 21 so that a passageway of the cooling air is divided into a first section Al and second section Bl. As shown in FIG. 15, the fixed plate 600 extends horizontally along the entire width and length of the air flow guide duct 21 arranged between the condenser 14 and the radiator 13. FIG. 16 shows the duct 21 together with the damper 220 and the fixed plate 600. The duct 21 generally forms a rectangular shape, and has an upper plate 21-1, and side plates 21-2 and 21-3. The damper 220 is rotatably connected to the side plates 21-2 and 21-3. The damper 220 is rotatable and connected to the side plates 21-2 and 21-3 of the duct 21 by means of a shaft 220; and a pair of springs 23 are provided for urging the damper 220 to take a closed position similar to the first embodiment in FIG. 2. It should be noted that lugs 602 are fixed to the rear edge of the plates 21-1, 21-2 and 21-3 for fixedly connecting the duct 21 to the radiator 13.

The embodiment shown in FIGS. 14 to 16 operates as follows. During the normal mode of operation (the temperature of the engine cooling water Tw is smaller than 100° C. (No result at step 204 in FIG. 4 or 8)), the damper 220 is in a closed position, as shown by a dotted line in FIG. 14, so that only a flow A from all portions of the condenser 14 is obtained and is introduced into all portions of the radiator 13. This operation is substantially the same as that obtained by the first embodiment in FIG. 2, since the fixed plate 600 does not, substantially, interfere with the flow from the condenser 14.

When the engine cooling water temperature Tw is equal to or higher than the predetermined value 100° C. (result at step 204 in FIG. 4 or 8), the damper 220 is moved to an open position (solid line in FIG. 14) by the actuator 25. In this case, in addition to flow A from the condenser to the radiator 13, an air flow B of low temperature by-passing the condenser 14 is generated, and is directly introduced into the radiator 13. As a result, the temperature of the air introduced into the radiator when (solid line) the damper 220 is open, as a whole, is reduced when compared with that obtained when (dotted line) the damper 220 is closed, thereby increasing the cooling efficiency of the radiator 13. It should be noted that the bottom portion 14a of the condenser 14, below the fixed plate 600, is opened to the passageway Bl when the damper 220 is open, but the amount of air passing the portion 14a is very small in comparison with the amount of the direct air flow B by-passing the condenser 14, because the flow resistance of the air flow passing the condenser 14 is higher than that of the by-passing flow B.

Figure 17:
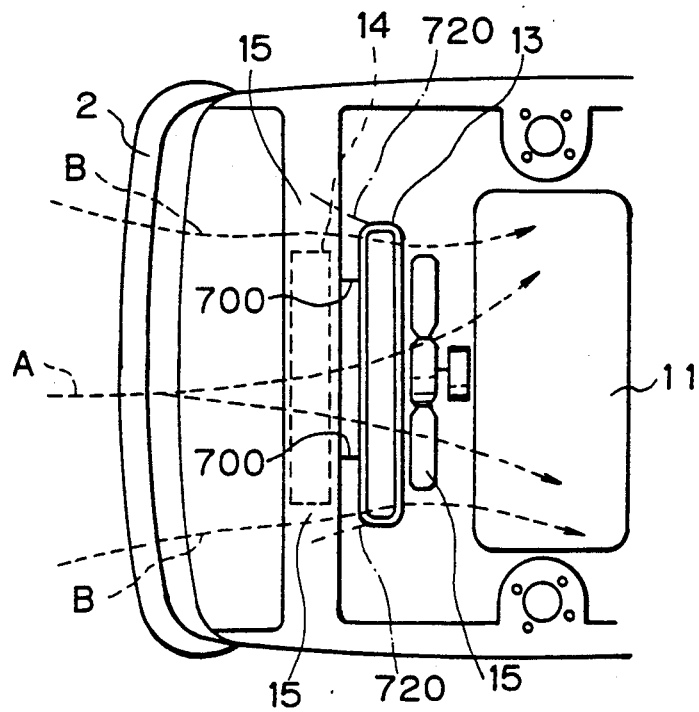
FIG. 17 shows an upper view of an engine compartment according to another embodiment of the present invention.
Figure 18:
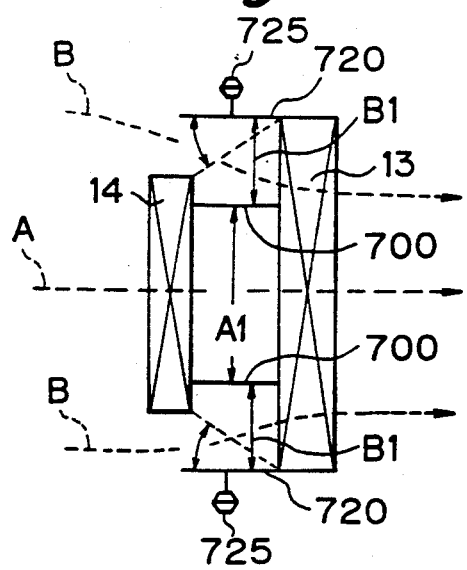
FIG. 18 is an enlarged, detailed view of a part of the embodiment in FIG. 17.

FIG. 17 and 18 shows another embodiment of the present invention, wherein a radiator 13 located downstream from a condenser 14 is in a horizontal plane and extends beyond the side ends of the condenser 14, a pair of dampers 720 are arranged on both sides of the radiator 13, and a pair of vertically extending fixed plates 700 are arranged between the condenser 14 and the radiator 13 so that the passageway of air to the radiator 13 is divided into a first section of dimension Al at the middle of the radiator core and a second section of dimension Bl at the sides of the radiator core. Each of the dampers 720 is, as shown in FIG. 18, connected to a corresponding actuator 725, so that the damper 720 is moved between a closed position (dotted line) so that all of the air introduced into the radiator 13 at its sections Al and Bl come from the condenser 14, as shown by the arrow A, and an opened position (solid line) where, in addition to the A introduced into the radiator 13 at its section Al, flow B by-passing the condenser 14, is directly introduced into the radiator 13 at its section B1 via the bypass passageway 15. Therefore, the embodiment in FIGS. 17 and 18 operates substantially the same as the embodiment in FIGS. 14 to 16 does.

Figure 19:
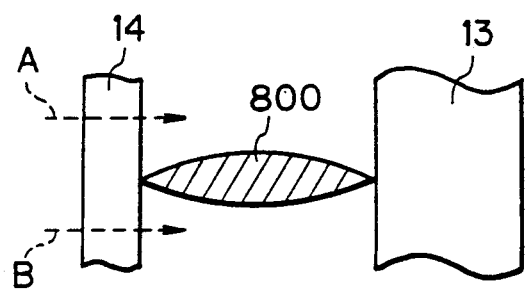
FIG. 19 show a cross sectional view of a fixed plate in a modification.
Figure 20:
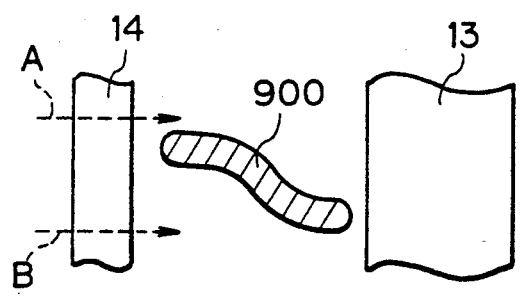
FIGS. 20 and 21 are similar to FIG. 19, but show other modifications, respectively.
Figure 21:
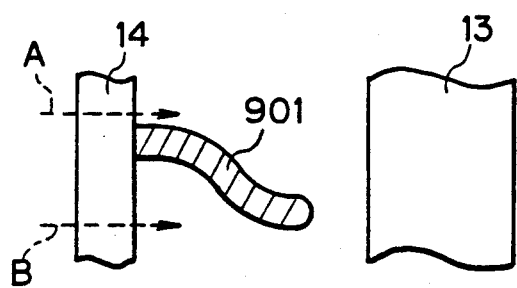

FIGS. 19 to 21 show various cross-sectional views of the fixed plate 600 in FIGS. 14 to 16 or plate 700 in FIGS. 17 and 18. In FIG. 19, the fixed plate 800 has a streamlined shape for obtaining a desired flow of air from the condenser to the radiator 13. As already explained with reference to FIG. 14, the damper 220 is usually closed (dotted line), so that all of the air introduced into the radiator 13 comes from the condenser 14. The section A1 of the air flow passageway to the radiator 13 located above the fixed plate 600 is larger than the section B1 of the air flow passageway to the radiator 13 located below the fixed plate 600. Therefore, the flow resistance to the section A1 of the air flow passageway of the larger dimension is smaller than the flow resistance to the section B1 of a smaller dimension. As a result, air is likely to be introduced into the larger dimension portion A1 than the smaller dimension portion B1 in the embodiment in FIG. 14 to 16, where the fixed plate is arranged between the condenser and the radiator. This causes a reduction in the cooling efficiency of the radiator 13 when the damper 220 is opened, because there is a section of the radiator that is not effectively used for the heat transfer. The provision of spacings of the fixed plate of the streamlined cross section eases the above mentioned tendency, so that an air flow can be effectively introduced into section B1.

In FIG. 20, the fixed plate 900 is uniformly bent and has spaces for the condenser 14, as well as the radiator 13. The spacings of the partition plate for the condenser 14 and, further, a large amount of air is more likely to be introduced into section B1.

The embodiment in FIG. 221 is different than that in FIG. 20 only in that the spacing is only provided between the fixed plate 901 and the condenser.

While embodiments are described with reference to the attached drawings, many modifications and changes can be made by those skilled in the art without departing from the scope and spirit of the present invention.

We claim:

1. In an arrangement of a vehicle with an internal combustion engine having an engine body and a radiator located at the front of the engine in the direction of the forward movement of the vehicle and an airconditioning system having a condenser arranged in front of the radiator, the improvement comprising:
   means for allowing a flow of air to be generated when the vehicle moves forward;
   guide wall means for defining a first passageway for receiving said flow generated and for obtaining a first flow of air from the condenser to the radiator, said guide wall means preventing the air, after passing through the radiator, from being returned back around the radiator into the flow from the condenser to the radiator;
   means for defining at least one second passageway for receiving said flow generated and for obtaining an air flow by-passing the condenser and for directly introducing the by-passed air flow into the radiator, and;
   means, responding to thermal load conditions of the engine, for selectively opening or closing said second passageway.

2. An arrangement according to claim 1, said guide wall means comprises a tubular duct extending from the condenser to the radiator in the direction of the flow of the air.

3. An arrangement according to claim 1, wherein said means, responding to thermal load conditions of the engine, for selectively opening or closing said second passageway comprises a damper for selectively opening said passageway, and means for operating the damper.

4. An arrangement according to claim 3, wherein said damper comprises a plurality of small dampers, each being moved between a closed and an opened position.

5. An arrangement according to claim 1, wherein said condenser forms a curved shape along the direction of the flow of air.

6. An arrangement according to claim 5, wherein the curved shape is forward and convex.

7. An arrangement according to claim 5, wherein the curved shape is forward and concave.

8. An arrangement according to claim 3, wherein said, damper operating means comprises a sensor for the detection of an engine cooling water temperature, and means, responsive to the detected temperature, for opening the second passageway when the detected temperature is higher than a predetermined value.

9. In an arrangement of a vehicle with an internal combustion engine having an engine body and radiator located in front of the engine in the direction of the forward movement of the vehicle, and an air-conditioning system having a condenser arranged in front of the radiator, the improvement comprising:
   means for allowing a flow of air to be generated when the vehicle moves forward;
   guide wall means for defining a first passageway for receiving said flow as generated and for obtaining a first flow of air from the condenser to the radiator, said guide wall means preventing the air after passing through the radiator from being returned back around the radiator into the flow from the condenser to the radiator;
   change over means moved between a first condition where the change over means forms a part of the guide wall means so that the air from the condenser is introduced into the radiator at its entire area, and a second condition where at least one second passageway is formed for receiving said flow as generated and for obtaining an air flow bypassing the condenser and for directly introducing the by-passed air flow into the radiator at its part, and;
   means, responding to thermal load conditions of the engine, for selectively opening or closing said change over means.

10. In an arrangement of a vehicle with an internal combustion engine having an engine body and a radiator located at the front of the engine in the direction of the forward movement of the vehicle, and an airconditioning system having a condenser arranged in front of the radiator, the improvement comprising:
    means for allowing a flow of air to be generated when the vehicle moves forward;
    guide wall means for defining a first passageway for receiving said flow as generated and for obtaining a first flow of air from the condenser to the radiator, said guide wall means preventing the air passing through the radiator from being returned back around the radiator into the flow from the condenser to the radiator;
    change over means moved between a first condition where the change over means forms a part of the guide wall means so that the air from the condenser is introduced into the radiator at its entire area, and a second condition where the guide wall means forms at least one opening;

means, responding to thermal load conditions of the engine, for selectively opening or closing said change over means, and;

means arranged between the condenser and the radiator for forming at least one second passageway for receiving said flow as generated and for obtaining an air flow by-passing the condenser and for directly introducing the by-passed air flow into the radiator when said change over means is at its second condition.

11. An arrangement, according to claim 10, wherein said at least one passageway forming means comprises second change over means moved between the first condition, where the second change over means located in the first passageway so as not to substantially block the flow of air therein when the first change over means is in its first condition, and a second condition where the second change over means blocks the flow from the condenser to the radiator so as to form said at least one second passageway when the first change-over means is in its second position.

12. An arrangement, according to claim 10, wherein said at least one passageway forming means comprises a fixed plate arranged between the condenser and the radiator substantially parallel in the direction of the flow of air.

* * * * *